United States Patent
Johnson et al.

(10) Patent No.: US 9,224,017 B2
(45) Date of Patent: Dec. 29, 2015

(54) USE OF MULTIPLEXED RFID CONTROLLER TO VERIFY CONNECTIONS IN AUTOMATED SYSTEMS

(75) Inventors: Jeffrey D. Johnson, Chalfont, PA (US); Kenneth D. Baker, Ambler, PA (US); Oscar Reif, Hannover, DE (US)

(73) Assignee: NewAge Industries, Inc., Southampton, PA (US)

( * ) Notice: Subject to any disclaimer, the term of this patent is extended or adjusted under 35 U.S.C. 154(b) by 570 days.

(21) Appl. No.: 13/319,223

(22) PCT Filed: May 7, 2010

(86) PCT No.: PCT/US2010/033971
§ 371 (c)(1),
(2), (4) Date: Jun. 28, 2012

(87) PCT Pub. No.: WO2010/129833
PCT Pub. Date: Nov. 11, 2010

(65) Prior Publication Data
US 2012/0256756 A1    Oct. 11, 2012

Related U.S. Application Data

(60) Provisional application No. 61/176,324, filed on May 7, 2009.

(51) Int. Cl.
G08B 13/14 (2006.01)
G06K 7/00 (2006.01)
G06K 7/10 (2006.01)
G06K 19/07 (2006.01)

(52) U.S. Cl.
CPC .......... *G06K 7/0008* (2013.01); *G06K 7/10316* (2013.01); *G06K 19/0717* (2013.01); *G06K 19/0718* (2013.01)

(58) Field of Classification Search
None
See application file for complete search history.

(56) References Cited

U.S. PATENT DOCUMENTS

| | | | |
|---|---|---|---|
| 7,976,508 B2* | 7/2011 | Hoag | 604/189 |
| 8,115,631 B2* | 2/2012 | Lange et al. | 340/572.1 |
| 8,150,549 B2* | 4/2012 | O'Dougherty et al. | 700/231 |
| 2002/0170731 A1* | 11/2002 | Garber et al. | 174/47 |
| 2004/0004113 A1 | 1/2004 | Blankenship | |
| 2004/0193453 A1* | 9/2004 | Butterfield et al. | 705/2 |
| 2005/0237241 A1 | 10/2005 | Garber et al. | |
| 2006/0049250 A1* | 3/2006 | Sullivan | 235/385 |
| 2006/0145815 A1* | 7/2006 | Lanzieri et al. | 340/10.2 |
| 2007/0107517 A1* | 5/2007 | Arnold et al. | 73/584 |
| 2008/0030345 A1 | 2/2008 | Austin et al. | |
| 2008/0186174 A1* | 8/2008 | Alexis et al. | 340/572.1 |
| 2009/0058606 A1* | 3/2009 | Munch et al. | 340/10.1 |
| 2009/0102610 A1* | 4/2009 | Lance | 340/10.2 |
| 2009/0237253 A1* | 9/2009 | Neuwirth | 340/572.1 |
| 2012/0053533 A1* | 3/2012 | Butterfield et al. | 604/257 |

FOREIGN PATENT DOCUMENTS

WO    2008118875    10/2008

* cited by examiner

*Primary Examiner* — Julie Lieu
(74) *Attorney, Agent, or Firm* — Volpe and Koenig, P.C.

(57) ABSTRACT

A system and method for using multiplexed RFID transceivers and RFID tags to verify connections and communicate the connection status to a host system is provided. RFID tags that are programmed with connection specific indicia are attached at or in proximity to various connections in a pharmaceutical or biotech processing system and interrogated by remote antennas driven by a multiplexed RFID transceiver. This enables a user to verify the status of each connection and communicate the connection status to a host system.

16 Claims, 4 Drawing Sheets

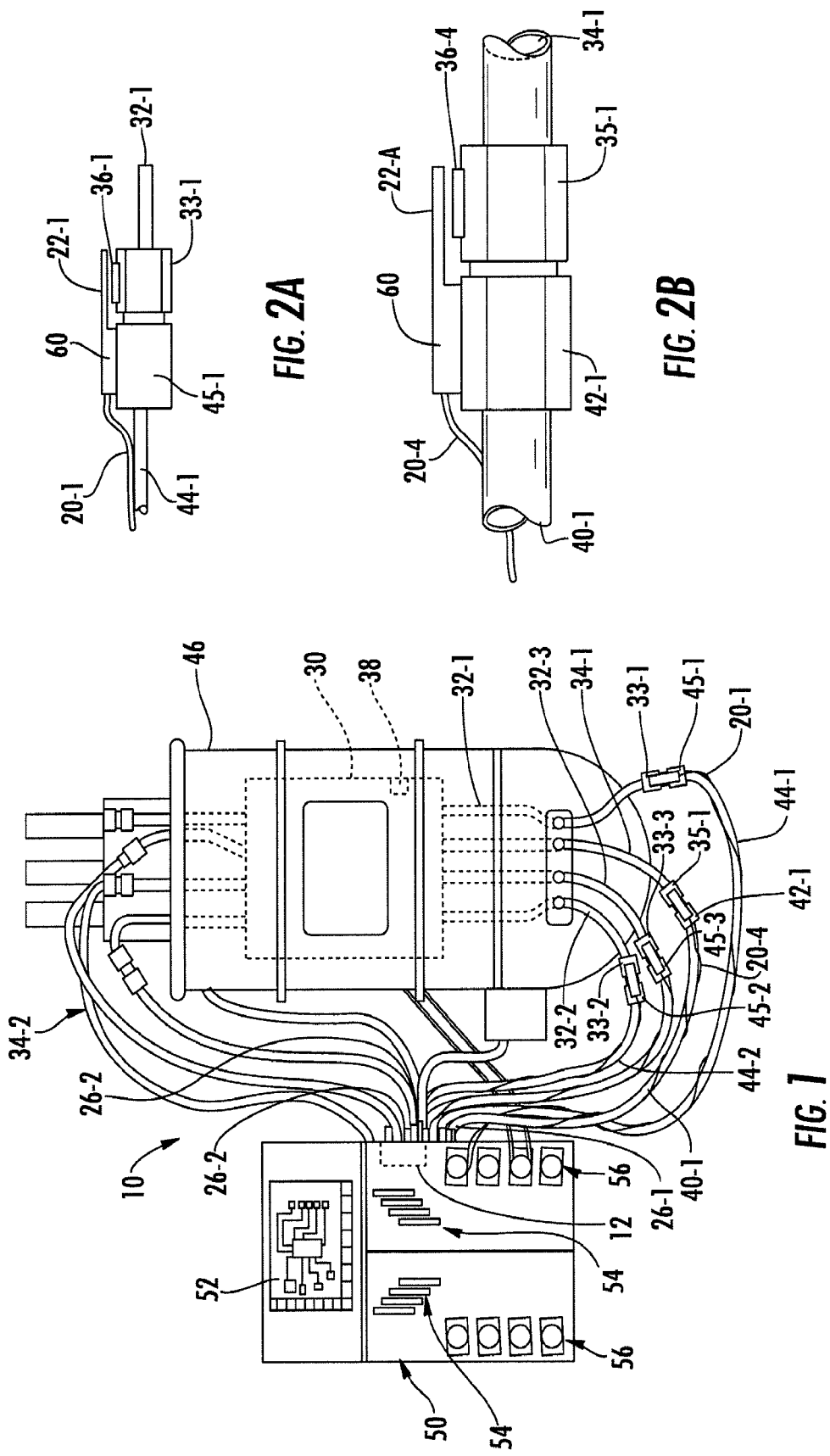

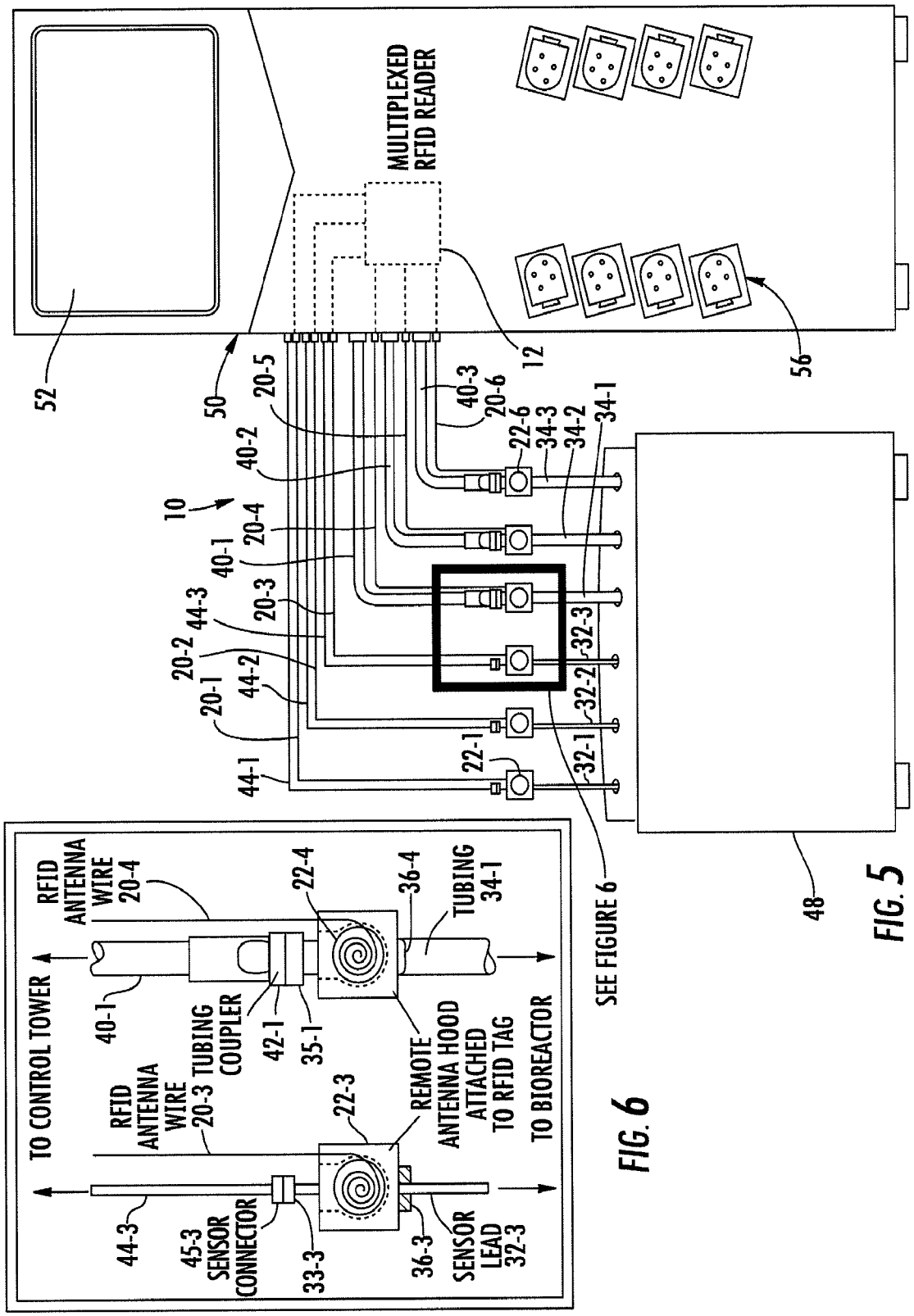

USE OF MULTIPLEXED RFID CONTROLLER TO VERIFY CONNECTIONS IN AUTOMATED SYSTEMS

CROSS-REFERENCE TO RELATED APPLICATIONS

This application is a 371 National Phase application of PCT/US2010/033971, filed May 7, 2010, which claims the benefit of U.S. Provisional Application No. 61/176,324, filed May 7, 2009.

FIELD OF INVENTION

The invention relates to system and method for using multiplexed RFID transceivers and RFID tags to verify connections in a chemical or bio-processing system that communicates the connection status to a host system.

BACKGROUND

Pharmaceutical and Biotech manufacturing operations are increasingly adopting single use systems to lower the cost of manufacturing. The traditional process of manufacturing products is in stainless steel vessels with hard piping. This process is expensive to install, difficult to reconfigure, expensive to clean, and requires significant effort to validate the sterility status of the equipment. Single-Use systems have changed this. Single-Use systems offer lower total cost due to: less space needed on the manufacturing floor, reduced capital expense on dedicated equipment, elimination of costly CIP (Clean in Place) and SIP (Steam in Place) systems, reduced labor in sterility verification, and decreased time between batches due to the elimination of the these cleaning/testing steps. Additionally, there is an environmental advantage with single-use systems; namely, the elimination of harsh CIP chemicals and their disposal, the elimination of the cost associated with steam generation for SIP processes, and a reduction in the demand for WFI (water for injection). Studies have shown that single-use systems have a lower overall environmental footprint than traditional stainless steel systems.

The drawback of such single-use systems is the need to properly connect numerous sensor wires and ingredient feed and discharge lines to one or more disposable main processing containers. The connections must be made accurately in order insure the integrity of the production process. However, the single-use nature of the equipment mandates that the cost for automatic verification be kept to a minimum.

Verification of connections in industrial processing equipment has been known through the use of RFID 'go-no-go' connections. Colder Products IdentiQuik Series Smart Couplings with RFID is one example of a system having a separate RFID reader built into one half of the connector. The results in increased size, and also increases the expense of the connectors due to the need for multiple expensive readers, which would need to be re-used. This is impractical for use in many applications, particularly in consideration of the single-use system becoming popular. With this known system, either the connector half having the RFID reader must be cleaned and/or sterilized after each use in order to make it economical, which does not lend itself to the single-use system concept, or the entire connection would need to be disposable, resulting in high cost due to the readers needing to be replaced after each use.

The current process for checking connections in single use systems includes: Paper log books, production check off lists, SOPs and visual inspections which can be prone to error. Drawbacks are that transcription errors can be made in paper log books or production check off lists. Additionally, log books, SOPs, check off lists, etc. are single point in time verifications. If, for example, sensors or lines are disconnected and reconnected incorrectly after the initial hook-up and check, there is no reliable way to re-check and/or ensure the integrity of the processes being carried out It would be desirable to provide a monitoring system where these errors can be minimized, if not eliminated.

SUMMARY

A system and method for using multiplexed RFID transceivers and RFID tags to verify connections and communicate the connection status to a host system is provided. RFID tags that are programmed with connection specific indicia are attached at or in proximity to various connections in a pharmaceutical or biotech processing system and interrogated by remote antennas driven by a multiplexed RFID transceiver. This enables a user to verify the status of each connection and communicate the connection status to a host system. The RFID tags are located on the side of connectors extending from a single use bag or container. The mating connector portions are provided with a RFID reading antenna and are connected back to a multiplexed transceiver and/or controller. For sensor connections, only a separate antenna wire is required to be added to or run with the wire connected to the sensor. For tubes or hoses that provide an intermediate connection to a sensing, pumping, monitoring or other processing fluid connection, a separate antenna wire is attached with, connected to or formed in the wall of the intermediate connection hose or tube, and is separately plugged into the multiplexed transceiver or controller as part of the connection process. The wire and antenna are low cost and can be discarded with the intermediate hose or tube.

Preferably, the ends of the antenna wires that connect to the multiplexed transceiver or controller have color coding or different connector configurations to ensure proper placement and connection.

In a preferred embodiment the multiplexed transceiver separately interrogates the RFID tag at each connection via the separate antennas to make sure that the proper connection has been made. Alternatively, the transceiver can simultaneously interrogate the antennas.

Additionally, it is possible to operate multiple sub-systems, with each including a multiplexed transceiver and antennas for a specific part of an overall manufacturing system, with each of the transceivers reporting separately to the manufacturing execution system, either directly, or via a PLC or other host computing system.

Preferably, a visual user interface is provided which provides a visual confirmation to the user of each connection and an indication of the correct connection being made based on the RFID tag sensed by the respective remote antenna. Additionally, other visual information regarding each connection and each disposable can also be provided, such as name, product ID, location, GUID, as well as a complete time-history status of the connection for later verification of a completed process. The single use bag or container preferably also has a separate RFID identifier with additional product information such as Lot number, part number, description, manufacturing date, expiry date, certifications (such as for sterilization), and tracking or additional information that can be written to the bag or container tag.

Because the current invention provides a connectable reader driving low cost and potentially disposable antennas on one side of each connection half, which read the RFID associated with the other side of each connection half, the invention can be used in many areas of a biotech and pharma manufacturing. RFID enabled connections allow for real-time connection status information, thereby providing the current status of the overall system. Additionally, process verification data can be automatically generated and stored by single batch or process run using the invention.

BRIEF DESCRIPTION OF THE DRAWING(S)

The foregoing Summary and the following detailed description will be better understood when read in conjunction with the following drawings that illustrate embodiments of the invention. In the drawings:

FIG. 1 is a view of a bio reactor/fermentation system used in connection with a single-use bag processing system for mixing and or processing chemical, pharmaceutical or biomaterials in which the system using a multiplexed RFID transceiver and RFID tags to verify connections and communicate the connection status to a host system in accordance with the present invention is integrated.

FIG. 2A is a view of an electrical connection to a sensor or a probe connected to or in the single use bag provided with an RFID tag, as well as the mating control system connector which also includes an RF antenna and wire for reading the RFID tag.

FIG. 2B is a view of a fluid connection to the single use bag provided with an RFID tag, as well as the mating control system connector which also includes an RF antenna and wire for reading the RFID tag.

FIG. 5 is a view similar to FIG. 1 of a bioreactor system and control tower in which the present system using a multiplexed RFID transceiver and RFID tags to verify connections and communicate the connection status to a host system in accordance with the present invention is integrated.

FIG. 6 is an enlarged view taken in the indicated area in FIG. 5 showing the antenna—RFID tag arrangement at the sensor connector and at the tubing connection.

DETAILED DESCRIPTION OF THE PREFERRED EMBODIMENT(S)

Figure 3B:
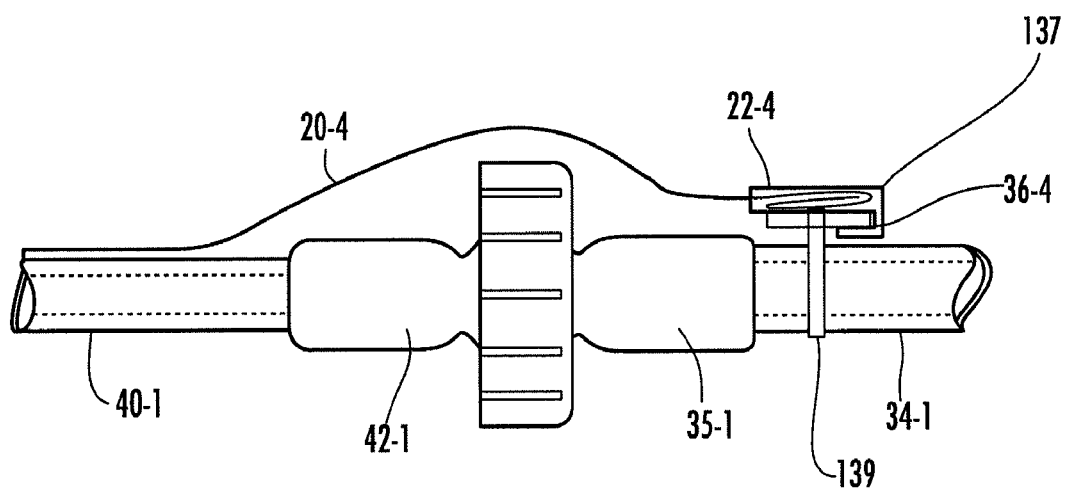
FIG. 3B is a view of a fluid connection to the single use bag provided with an RFID tag located in proximity to the connection half, as well as the mating control system connector which also includes an RF antenna and wire for reading the RFID tag located in proximity to the connection half, with the RF antenna engaged or clipped to the RFID tag.

Certain terminology is used in the following description for convenience only and is not considered limiting. Words such as "front," "back," "top," and "bottom" designate directions in the drawings to which reference is made. This terminology includes the words specifically noted above, derivatives thereof, and words of similar import. A list of items indicated as "at least one of A, B or C," where A, B and C represent different items, is defined as any individual one of A, B or C, or combinations thereof. Additionally, the terms "a" and "one" are defined as including one or more of the referenced item unless specifically noted.

Referring to FIG. 1, process equipment for chemical, biological or pharmaceutical production using a single use bag or container 30 is shown, which incorporates a multiplexed RFID connection verification system 10 in accordance with the present invention. The connection verification system 10 includes a multiplexed RF transceiver 12, preferably integrated with the system controller 50. The illustrated processing system also utilizes a batch fermentor/incubator 46, such as that available from Sartorius Stedim Biotech, and the single use bag or container is located in the fermentor/incubator 46. However, the multiplexed RFID connection verification system 10 can be used in connection with other types of processing equipment, such as the bioreactor 48, as shown in FIG. 5. One suitable multiplexed RF transceiver is the SkyePlus MXH available from SkyeTek of Westminster, Colo.

Figure 3A:
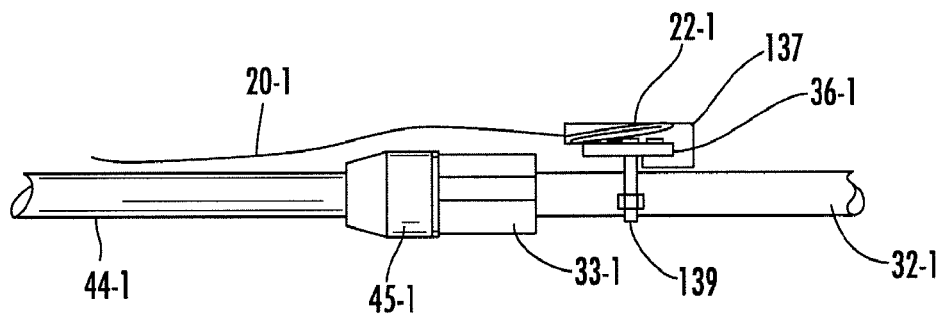
FIG. 3A is a view of an electrical connection to a sensor or a probe connected to or in the single use bag provided with an RFID tag located in proximity to the connection half, as well as the mating control system connector which also includes an RF antenna and wire for reading the RFID tag located in proximity to the connection half, with the RF antenna engaged or clipped to the RFID tag.
Figure 4:
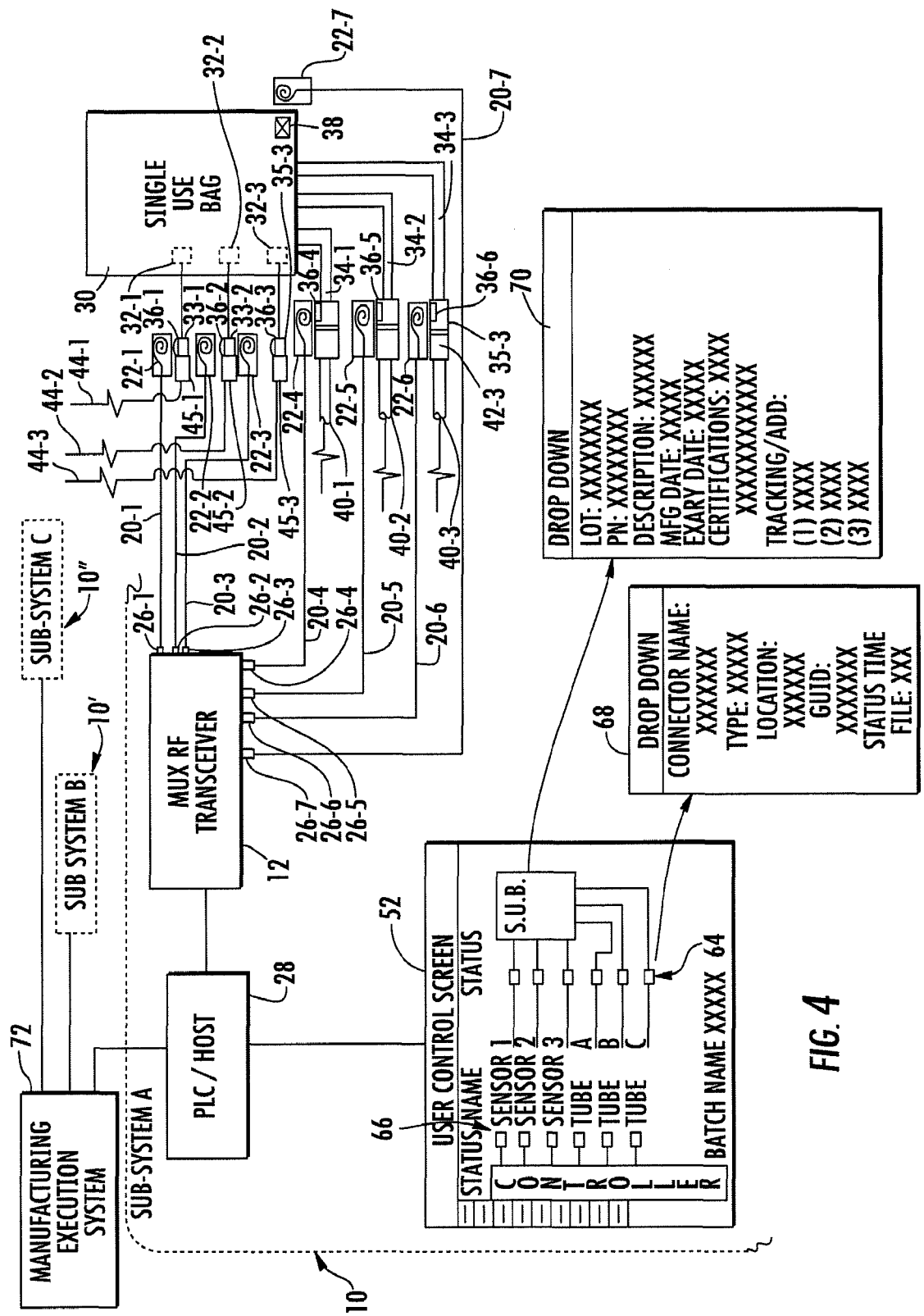
FIG. 4 is a schematic view of a system according to the invention being used in connection with a bio, chemical or pharmaceutical manufacturing process.

In the illustrated embodiment, the single use bag or container 30 includes a plurality of sensors 32-1 through 32-3 located on or in the bag or container 30, as illustrated in FIG. 4. The sensors 32-1 through 32-3 include wires which extend from bag or container 30 and out of the batch fermentor/incubator 46 that end in connector halves 33-1 through 33-3. Additionally, a plurality of tubes 34-1 through 34-3 also extend from the single use bag or container 30. These tubes 34-1 through 34-3 terminate in connector halves 35-1 through 35-3, of which connector 35-1 is shown in FIG. 1 and the remainder or separately labeled in FIG. 4. An RFID chip 36-1 through 36-6 is connected at or in proximity to each of the connector halves 33-1 through 33-3 for the sensors 32-1 through 32-3 and the connector halves 35-1 through 35-3 for the tubes 34-1 through 34-3, as shown, for example, in FIGS. 2A, 2B, 3A and 3B. Additionally, a separate bag RFID tag 38 is preferably attached to the single use bag or container 30. The RFID tags 36-1 through 36-6 preferably include information on the specific connections to be made. For example, the RFID tags 36-1 through 36-3 used for the sensors 32-1 through 32-3 can identify the type of sensor, for example, oxygen, nitrogen, ph, conductivity or other types of characteristics being sensed. Additionally, information on the name of the connector, specific location, as well as the global unique identifier (GUID) can also be provided. Optionally, a writable status time file can also be provided directly on the RFID tags 36-1 through 36-3 in order to write data on the connection status after it is positively made. It is also possible for the RFID tags 36-1 through 36-6 to have integrated RFID enabled sensors in place of the separate sensors 32-1 through 32-3 so that the RFID tag identifies the connection and relays sensor data when interrogated. One example of RFID Sensors is discussed in *Integration of Passive Multivariable RFID Sensors Into Single-Use Biopharmaceutical Manufacturing Components*, Radislav A. Potyrailo at al., IEEE RFID 2010, which is incorporated herein by reference as if fully set forth.

The RFID tags 36-4 through 36-6 preferably include information on the specific material to be carried by a tube 34-1 through 34-3 along with the connector name, type, location, GUID as well as other information, such as the status time file for the connection being made.

While one specific arrangement of sensors and tubes has been illustrated, those skilled in the art will recognize that the system 10 is configurable to match and monitor multiple different connector configurations, and is scalable to the number of connections being made.

The bag RFID tag 38 preferably includes information on the single use container or bag 30, such as the part number, lot number, description, manufacturing date, expiration date, certifications (such as sterilization certifications), as well as optionally the ability to write tracking data and/or additional information onto the tag, either at the time that the single use bag or container 30 is made or during its use in a manufacturing process, such as illustrated in FIGS. 1 and 4.

A plurality of wires 44-1 through 44-3 for connection to the sensors extend from the PLC/host controller 28, which can be a programmable PC or other programmable controller, for execution of the manufacturing steps, to the connector halves 33-1 through 33-3. Along with the sensor wires 44-1 through 44-3 which include the mating connectors 45-1 through 45-3 for engagement to the sensor wires 32-1 through 32-3, separate antenna wires 20-1 through 20-3 extend parallel to or with the sensor wires 44-1 through 44-3. Preferably, each of the antenna wires 20-1 through 20-3 includes an antenna 22-1 through 22-3 which is connected at or in proximity to the connector half 45-1 through 45-3 which engages with the sensor connector half 33-1 through 33-3. The antenna wires 20-1 through 20-3 can be bonded or co-extruded with the hoses.

As shown in detail in FIG. 2A, in one preferred arrangement an antenna holder 60 is provided at each connector half 45-1 through 45-3 for holding the antenna 22-1 through 22-3 over the RFID chip 36-1 through 36-3 which is connected to the sensor connector half 33-1 through 33-3, preferably in close proximity to the RFID tag. The opposite end of the antenna wires 20-1 through 20-3 include MUX connectors 26-1 through 26-3 which can either be color coded or have different connector configurations for connection to the multiplexed RF transceiver 12 or to appropriate connections on the system controller 50 if the multiplexed RF transceiver 12 is incorporated therein.

Similarly, for the tubes 34-1 through 34-3, intermediate hoses or tubes 40-1 through 40-3 are provided with mating connector halves 42-1 through 42-3. Antenna wires 20-4 through 20-6 extend along, wrap around or can be formed in the walls of the intermediate tubes or hoses 40-1 through 40-3, at least in the area adjacent to the connector halves 42-1 through 43-3, and are connected to antennas 22-4 through 22-6. The antennas 22-4 through 22-6 are connected to antenna holder 60, for example, as shown in FIG. 2B, which hold the antennas 22-4 through 22-6 in proximity to the RFID tags 36-4 through 36-6 located on the connector halves 35-1 through 35-3 of the tubes 34-1 through 34-3 extending from the single use bag or container 30. The antenna wires 20-4 through 20-6 include MUX connectors 26-4 through 26-6 which are connected to the multiplexed RF transceiver 12 and/or the system controller 50 if the multiplexed RF transceiver 12 is integrated therein.

Referring to FIGS. 3A and 3B, the RFID tags 36-1 and 36-4 can also be connected to the sensor wire 32-1 or tube 34-1 in proximity to the respective connector half 33-1, 35-1 using a tie-wrap 139 or other easily applied connection element. The antenna wires 20-1, 20-4 extend along the wire 44-1 or intermediate tube 40-1M proximity to the respective mating connector half 45-1, 42-1 and the antenna 22-1, 22-4 is attached directly to the RFID tag 36-1, 36-4 using a clip 137. This allows for easy retrofitting or installation of the RFID tags 36-1 through 36-6 as well as the antennas 22-1 through 22-6 with existing systems and equipment.

As shown in FIG. 4, preferably the multiplexed RF transceiver 12 communicates with the PLC/host 28 which may be part of the system controller 50 or a separate device connected to the system controller 50. The system controller 50 preferably includes a user touch screen 52 having status indicators 64 for the connection between each of the sensors 32-1 to 32-3 or tubes 34-1 to 34-3 extending from the single use bag 30. When the connections are properly made, the antennas 22-1 through 22-6 read the associated RFID tags 36-1 through 36-6 which become located in proximity to the antennas 22-1 through 22-6 if the connection is properly made. The antennas 22-1 through 22-6 are preferably tuned for short range reading (within approximately 10 mm or less) insuring that an RFID tag 36-1 to 36-6 is only read if the connection has been properly made based on the proximity of the RFID tag and the antenna.

The multiplexed RF transceiver 12 can either serially read each of the antennas 22-1 through 22-6 or can read them at the same time. However, it is believed that serially reading the antennas will provide more accurate results and less chance of crosstalk or cross-reads. If the connections are properly made, the status indicator 64 can provide either a visual indicator, such as a green light at the appropriate point on the system diagram on the control screen 52 indicating that the proper connection has been made. Further, the system 10 can also provide status indicators 66 showing the connections of the antenna wires 20-1 through 20-6 to the multiplexed RF transceiver 12. This can also provide a visual indicator, such as a green light when the connection is properly made to the multiplexed RF transceiver 12 and/or the system controller 50 if it is integrated therein. A bad connection for any of the sensors or tubes can be visually indicated, such as with a red indicator light. Alternatively and/or in addition to the visual indicator, an audible indication can be provided if one or more of the connections is not properly made and graphical directions can be provided on the screen for checking and/or correcting the connections. The system controller 50 can optionally allow/prevent system startup based on the aggregate status of indicators 64.

Thus, this invention offers time saving for the end-user—without this invention the end-users operator must trace all tubing and sensor wires from source to connection. With many wires and tubing this can be a time consuming process for double-checking the correct connections. With the RFID connection verification system 10, the verification of the connection is automatic.

It is further preferred that the antenna 22-7 for reading the bag RFID tag 38 is also connected to the multiplexed RF transceiver 12, as shown in FIG. 4, and/or the system controller 50 so the data on the single use bag or container 30 can be read and verified. This can include, for instance, the identification of each of the sensors and/or tubes for inputs and outputs to the single use bag 30 during processing for a particular chemical, biological or pharmaceutical manufacture or test.

As illustrated in FIG. 4, the system 10 can be connected to a manufacturing execution system (MES) like a DeltaV or Pro Pack, which are available from Emerson Electric Co. of St. Louis, Mo. and Rockwell Automation of Milwaukee, Wis. The tubing and/or sensor connection information from the system 10 can be made visible on the MES. This can be used in connection with an execution decision rule application based on the connection status.

Still with reference to FIG. 4, it is also possible for multiple of the multiplex RFID connection verification systems 10 to be provided and connected to the MES 72 such that each system 10 forms a sub-system, such as sub-system A, sub-system B and sub-system C which are identified in FIG. 4 as 10, 10' and 10", respectively. These sub-systems can be utilized throughout the plant where the product moves from one part of a plant to another part of a plant and into and out of different single use systems.

Referring to FIGS. 5 and 6, the system 10 is shown more schematically in use with a bioreactor 48 which holds a single-use bag or container (not shown). Here, the paths of the sensor wires 44-1 to 44-3 and the intermediate hoses 40-1 to 40-3, along with their associated antenna wires 20-1 to 20-6 can be clearly seen. The antenna wires 20-1 to 20-6 are connected to the multiplexed RF transceiver 12 in the system controller 50. FIG. 6 shows two of the antennas 22-3 and 22-4 in proximity to the connections formed by the connector halves 33-3 and 45-3 for the sensor and the connector halves 35-1 and 42-1 for the tubing 34-1 that extends from the disposable in the bioreactor 48.

While the preferred embodiments of the invention have been described in connection with the connections from a single-use bag or container 30, it can also be used with other disposable items used in biological, chemical and/or pharmaceutical processing that have one or more connections that should be monitored.

The present invention provides the advantage that the cost of the single use bag or container 30 or other single use item including RFID tags at each of the output or connections is relatively inexpensive for use as a throw-away or single use item. The mating connector halves for the sensor wires which are connected to the system controller for executing the manufacturing process can be reused, and the antenna wires 20-1 through 20-3 along with the associated antennas 22-1 through 22-3 are paired with and/or provided alongside of these sensor wires 44-1 through 44-3. With respect to the fluid connection hoses, when intermediate tubes or hoses 40-1 through 40-3 are utilized, antenna wires 20-4 through 20-6 are associated with or wrapped around these tubes or hoses 40-1 through 40-3 and antennas 22-4 through 22-6 are provided at or in proximity to the connector halves 42-1 through 42-3. For single use system where these intermediate tubes or hoses 40-1 through 40-3 are discarded rather than cleaned, only the low costing antenna wires 20-4 to 20-6 and antennas 22-4 to 22-6 are discarded with these items thus making the system economical for use.

The connection verification system 10 not only provides a solution to single use systems where the whole system is disposed of, including tubing, sensors, antennas, wires, bags or containers, but because the reader is part of the fixed system and reused, an economical and reliable solution is provided for connection verification. Some exemplary single-use systems where the verification system 10 can find use include: Biobags, Bio Reactors, Transfer panels which move product from one part of the plant to another and pass though ports where product is moving from one room to another.

While a preferred embodiment of the system 10 as well as the use of the system 10 as a sub-system in connection with a manufacturing execution system 72 has been described, those skilled in this technology will understand that the present RFID connection verification system 10 can be used in other applications with other single use items, and the invention is not limited to the specific embodiment disclosed. Rather, the invention is defined by the appended claims.

What is claimed is:

1. A multiplexed RFID verification system, comprising:
a multiplexed RF transceiver;
a plurality of antenna wires connected to the transceiver and having antennas located at distal ends thereof;
a plurality of sensor wires and/or tubes which are connected to a processing system and having respective connector halves, and one of the antennas is associated with each of the respective connector halves;
a single use item for use in connection with the processing system having a plurality of sensors and/or tubes extending therefrom, each having an associated single-use side connector half;
an RFID tag associated with each of the single-use side connector halves;
and the single-use side connector halves are adapted to be connected to corresponding ones of the connector halves extending from the multiplexed RF transceiver with the respective RF antenna being located in proximity to the RFID tags on respective ones of the single-use side connector halves being connected, such that each said RF antenna reads only the respectively connected RFID tag;
the multiplexed RF transceiver configured to serially read the plurality of antenna wires; and
a controller which receives signals from the multiplexed RF transceiver and provides a signal verifying connections between the connector halves, and being further configured to prevent system startup if an error is detected in the connections between the single-use side connector halves and the processing system side connector halves to prevent contamination of the single-use item.

2. The multiplexed RFID verification system of claim 1, wherein the antenna wires connected to the transceiver have color coding or different connector configurations that match corresponding color coded or connector configurations on the transceiver.

3. The multiplexed RFID verification system of claim 1, wherein the transceiver separately interrogates the RFID tag at each of the single use side connector halves via the separate antennas to verify a proper connection.

4. The multiplexed RFID verification system of claim 1, wherein signal verifying connections is a visual signal.

5. The multiplexed RFID verification system of claim 1, further comprising a visual display connected to the controller that displays status indicators for the connections.

6. The multiplexed RFID verification system of claim 1, wherein the antennas have a maximum reading range of about 10 mm.

7. The multiplexed RFID verification system of claim 1, wherein the processing system connector halves include an extension for locating the antenna over a portion of the single-use side connector halves that holds the respective RFID tag.

8. The multiplexed RFID verification system of claim 1, wherein the sensor wires and/or the tubes which are connected to the processing system and the associated antenna wires are single use.

9. The multiplexed RFID verification system of claim 1, wherein the RFID tags include RFID sensors integrated therein.

10. The multiplexed RFID verification system of claim 1, wherein the respective RFID tags include information on a specific one of the connections to be made.

11. The multiplexed RFID verification system of claim 1, wherein the RFID tags are re-writeable to allow tracking data and additional information to be written onto the tag.

12. The multiplexed RFID verification system of claim 1, wherein the RFID tags are connected to the single-use connector halves.

13. The multiplexed RFID verification system of claim 12, wherein the antennas are connected to and extend outwardly from the processing system connector halves.

14. The multiplexed RFID verification system of claim 1, wherein the RFID tags are attached to the plurality of sensor wires and/or tubes in proximity to the associated connector halves.

15. The multiplexed RFID verification system of claim 14, wherein the antennas extend outwardly past the processing system connector halves and are connected to the associated RFID tags with a clip.

16. A manufacturing execution system comprising at least one of the multiplexed RFID verification systems of claim 1 connected thereto which provides data to the manufacturing execution system.

* * * * *